(12) United States Patent
Maruta et al.

(10) Patent No.: US 12,007,045 B2
(45) Date of Patent: Jun. 11, 2024

(54) THREADED CONNECTION FOR PIPE

(71) Applicants: NIPPON STEEL CORPORATION, Tokyo (JP); VALLOUREC OIL AND GAS FRANCE, Aulnoye-Aymeries (FR)

(72) Inventors: Satoshi Maruta, Tokyo (JP); Yousuke Oku, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 241 days.

(21) Appl. No.: 17/754,227

(22) PCT Filed: Dec. 22, 2020

(86) PCT No.: PCT/JP2020/047836
§ 371 (c)(1),
(2) Date: Mar. 28, 2022

(87) PCT Pub. No.: WO2021/145162
PCT Pub. Date: Jul. 22, 2021

(65) Prior Publication Data
US 2022/0333719 A1    Oct. 20, 2022

(30) Foreign Application Priority Data

Jan. 17, 2020   (JP) ................................. 2020-005811

(51) Int. Cl.
*F16L 15/00*   (2006.01)
(52) U.S. Cl.
CPC ................................. *F16L 15/007* (2013.01)

(58) Field of Classification Search
CPC ..... F16L 15/007; F16L 15/002; F16L 15/004; F16L 15/06; E21B 17/0423
See application file for complete search history.

(56) References Cited

U.S. PATENT DOCUMENTS

| 4,696,498 A | * | 9/1987 | Church | ................. | F16L 15/002 |
| | | | | | 285/334 |
| 2013/0181442 A1 | | 7/2013 | Sonobe et al. | | |

(Continued)

FOREIGN PATENT DOCUMENTS

| CA | 3061450 A1 | 11/2018 |
| EP | 3572613 A1 | 11/2019 |

(Continued)

*Primary Examiner* — David Bochna
(74) *Attorney, Agent, or Firm* — Greer Burns & Crain Ltd.

(57) ABSTRACT

In a threaded connection for pipe with a two-step thread construction, including intermediate shoulders, during stabbing, the internal-pressure sealing surface of the pin near its tip is prevented from contacting the intermediate shoulder of the box and thus receiving damage. $L_P$, $L_B$, $h_P$ and $h_B$ shown in FIG. 2 satisfy Expressions (1) and (2), provided below. $\theta_{seal}$ is the angle of slope of the straight line connecting the two ends, as determined along the axial direction, of the internal-pressure sealing surface of the pin. Expression (3), provided below, is also satisfied.

$$L_P < L_B \quad (1)$$

$$h_B < h_P (L_B - L_P) \times \tan \theta_{seal} \quad (2)$$

$$L_{SP} < L_B - L_P \quad (3)$$

15 Claims, 4 Drawing Sheets

(56) References Cited

U.S. PATENT DOCUMENTS

| | | |
|---|---|---|
| 2017/0167641 A1 | 6/2017 | Daly et al. |
| 2018/0363813 A1 | 12/2018 | Inose et al. |
| 2020/0278056 A1* | 9/2020 | Oku ................. F16L 15/007 |
| 2020/0278057 A1 | 9/2020 | Inose et al. |
| 2022/0412486 A1* | 12/2022 | Maruta ............. F16L 15/007 |

FOREIGN PATENT DOCUMENTS

| | | |
|---|---|---|
| JP | 2012149760 A | 8/2012 |
| JP | 2014101983 A | 6/2014 |
| JP | 2014105731 A | 6/2014 |
| JP | 2018536818 A | 12/2018 |
| WO | 2018211873 A1 | 11/2018 |
| WO | 2019093163 A1 | 5/2019 |
| WO | 2019093311 A1 | 5/2019 |

* cited by examiner

THREADED CONNECTION FOR PIPE

TECHNICAL FIELD

The present disclosure relates to a threaded connection for pipe used to connect steel pipes, for example.

BACKGROUND ART

In oil wells, natural-gas wells, etc. (hereinafter collectively referred to as "oil wells"), underground resources are mined using a casing system that forms a multi-run well wall and tubing positioned within the casing system to produce oil or gas. Such casing or tubing is composed of a large number of steel pipes connected in series, where a threaded connection for pipe is used to connect such pipes. A steel pipe used in an oil well is also referred to as oil-well pipe.

Threaded connections for pipe are generally categorized as integral type and coupling type. Integral threaded connections for pipe are disclosed, for example, in Patent Documents 1 and 2, listed below, and a coupling-type threaded connection for pipe is disclosed in, for example, Patent Document 3, listed below.

An integral connection directly connects oil-well pipes. Specifically, a female thread is provided on one end of each oil-well pipe, while a male thread is provided on the other end of each pipe; into the female thread of one oil-well pipe is screwed the male thread of another oil-well pipe such that the oil-well pipes are connected.

In the case of a coupling-type connection, oil-well pipes are connected using a tubular coupling. Specifically, a female thread is provided on each end of the coupling, while a male thread is provided on each end of each oil-well pipe. Then, one male thread of one oil-well pipe is screwed into one female thread of the coupling and one male thread of another oil-well pipe is screwed into the other female thread of the coupling such that the oil-well pipes are connected by means of the coupling. That is, a coupling-type connection directly connects a pair of pipes, one of which is an oil-well pipe while the other one is a coupling.

Generally, an end of an oil-well pipe on which a male thread is provided includes an element to be inserted into a female thread provided on an oil-well pipe or coupling, and thus is referred to as pin. An end of an oil-well pipe or coupling on which a female thread is provided includes an element for receiving a male thread provided on an end of an oil-well pipe, and thus is referred to as box.

In recent years, deeper and deeper wells with higher temperatures and higher pressures have been developed. A deep well has a complicated formation-pressure distribution with depth, which requires an increased number of casing runs; thus, a type of threaded connection is sometimes used which has a maximum outer diameter, i.e., a box outer diameter, that is substantially equal to the outer diameter of the pipe body of the oil-well pipe. A threaded connection with a box outer diameter that is substantially equal to the outer diameter of the pipe body of the oil-well pipe is sometimes referred to as flush-type threaded connection. Further, a threaded connection with a box outer diameter that is generally smaller than 108% of the outer diameter of the pipe body of the oil-well pipe is sometimes referred to as semi-flush-type threaded connection. Such a flush-type or semi-flush-type threaded connection is not only required to have high strength and sealability but is under strict size restrictions for its various portions in order to allow thread structures and seal structures to be positioned within a limited pipe-wall thickness.

For flush-type and semi-flush-type threaded connections with tight size restrictions, a connection design is often employed that includes intermediate shoulders in the middle of the connection as determined along the axial direction, with male and female threads each constituted by a pair of threads positioned forward and rearward of the associated intermediate shoulder, i.e., two thread steps. As disclosed in Patent Documents 1 and 2, such a threaded connection with a two-step thread construction includes an internal-pressure seal near the tip of the pin as well as an external-pressure seal near the open end of the box to ensure sealability against internal pressures and sealability against external pressures under strict size restrictions.

It is noted that both Patent Documents 1 and 2 are applications filed by the present applicant, and the drawings accompanying these applications are schematic views for illustrating their inventive features in an easy-to-understand way, where the dimensions of portions that are not related to such features are not exact ones. Accordingly, it is understood that technical features that are not explicitly disclosed in the descriptions of these applications should not be derived from the dimensions, as shown in the drawings, of portions not described in the descriptions.

PRIOR ART DOCUMENTS

Patent Documents

[Patent Document 1] JP 2018-536818 A
[Patent Document 2] WO 2018/211873
[Patent Document 3] JP 2012-149760 A

SUMMARY OF THE INVENTION

Problems to be Solved by the Invention

A threaded connection with a two-step thread construction includes a box intermediate shoulder near the middle of the box as determined along the axial direction; as such, when the pin is being inserted into the box or during alignment immediately before the beginning of screwing-in of the male thread into the female thread (i.e., before the beginning of thread interference), the pin inner sealing surface near the pin tip (i.e., internal-pressure pin sealing surface) may hit the corner of the box intermediate shoulder and damage it.

During actual work at a drilling site, a stabbing guide is mounted on the open end of the box and then the pin is stabbed therein; as such, the box outer sealing surface near the open end of the box (i.e., external-pressure box sealing surface) is protected by the stabbing guide and is unlikely to be damaged by the pin intermediate shoulder hitting it. On the other hand, the pin inner sealing surface may contact the box intermediate shoulder even if a stabbing guide is used.

In environments where oil-well pipes are used, internal pressures are generally higher than external pressures; as such, in a threaded connection with a two-step thread construction that is sealed against external pressures by its outer seal and sealed against internal pressures by its inner seal, it is important to prevent damage to the inner seal.

An object of the present disclosure is to provide a threaded connection for pipe with a two-step thread construction that prevents the box intermediate shoulder from hitting the pin inner sealing surface during stabbing and thus prevents damage to the pin inner seal.

Means for Solving the Problems

A threaded connection for pipe according to the present disclosure includes a tubular pin and a tubular box, the pin and the box adapted to be made up as the pin is screwed into the box.

The pin includes: a first male thread; a second male thread located further toward a tip than the first male thread is and having a smaller diameter than the first male thread; a pin intermediate shoulder located between the first male thread and the second male thread; a pin inner sealing surface located further toward the tip than the second male thread is; and a pin outer sealing surface located further toward a basement than the first male thread is.

The box includes: a first female thread adapted to be in engagement with the first male thread when the connection is made up; a second female thread adapted to be in engagement with the second male thread when the connection is made up; a box intermediate shoulder located between the first female thread and the second female thread and adapted to be in contact with the pin intermediate shoulder when the connection is made up; a box inner sealing surface adapted to be in contact with the pin inner sealing surface when the connection is made up; and a box outer sealing surface adapted to be in contact with the pin outer sealing surface when the connection is made up.

The threaded connection for pipe according to the present disclosure satisfies the following expressions, (1) and (2).

[Formula 1]

$$L_P < L_B \qquad (1)$$

[Formula 2]

$$h_B < h_P + (L_B - L_P) \times \tan \theta_{seal} \qquad (2)$$

Here, $L_P$ is a distance between an end of the pin inner sealing surface located closer to the pin intermediate shoulder, on one hand, and a radially outer edge of the pin intermediate shoulder, on the other hand, as measured in an axial direction; $L_B$ is a distance between an end of the box outer sealing surface located closer to the box intermediate shoulder, on one hand, and a radially inner edge of the box intermediate shoulder, on the other hand, as measured in the axial direction; $h_P$ is a distance between the end of the pin inner sealing surface located closer to the pin intermediate shoulder, on one hand, and the radially outer edge of the pin intermediate shoulder, on the other hand, as measured in a radial direction; $h_B$ is a distance between the end of the box outer sealing surface located closer to the box intermediate shoulder, on one hand, and the radially inner edge of the box intermediate shoulder, on the other hand, as measured in the radial direction; and $\theta_{seal}$ is an angle of slope of a straight line connecting two ends, as determined along the axial direction, of the pin inner sealing surface.

Preferably, an angle of slope of a straight line connecting the end of the pin inner sealing surface located closer to the pin intermediate shoulder and the radially outer edge of the pin intermediate shoulder, θp, is larger than an angle of slope of a straight line connecting the end of the box outer sealing surface located closer to the box intermediate shoulder and the radially inner edge of the box intermediate shoulder, θB. More preferably, the angle of slope θp is smaller than 6°.

The present disclosure is particularly useful if $L_P$ is larger than 94% of $L_B$.

Even in implementations where $h_B$ is larger than $h_P$, the present disclosure prevents at least damage to the seal point SP on the pin inner sealing surface that experiences the largest seal contact pressure; since such implementations provide a design margin for the first female thread 31, which is located within the radial range of $h_B$, and for the corresponding first male thread 21, this margin can be utilized for various functions.

To further ensure that the seal point SP is protected, it is preferable that a distance $L_{SP}$, as measured in the axial direction, between the seal point SP on the pin inner sealing surface at which a seal contact force resulting from the surface's contact with the box inner sealing surface upon completion of make-up is at its largest, one hand, and the end $P_1$ of the pin inner sealing surface located closer to the pin intermediate shoulder, on the other hand, be smaller than a distance between $L_B$ and $L_P$.

Effects of the Invention

The present disclosure prevents, during stabbing, the pin inner sealing surface from hitting the box intermediate shoulder and thus receiving damage.

EMBODIMENTS FOR CARRYING OUT THE INVENTION

Figure 1:
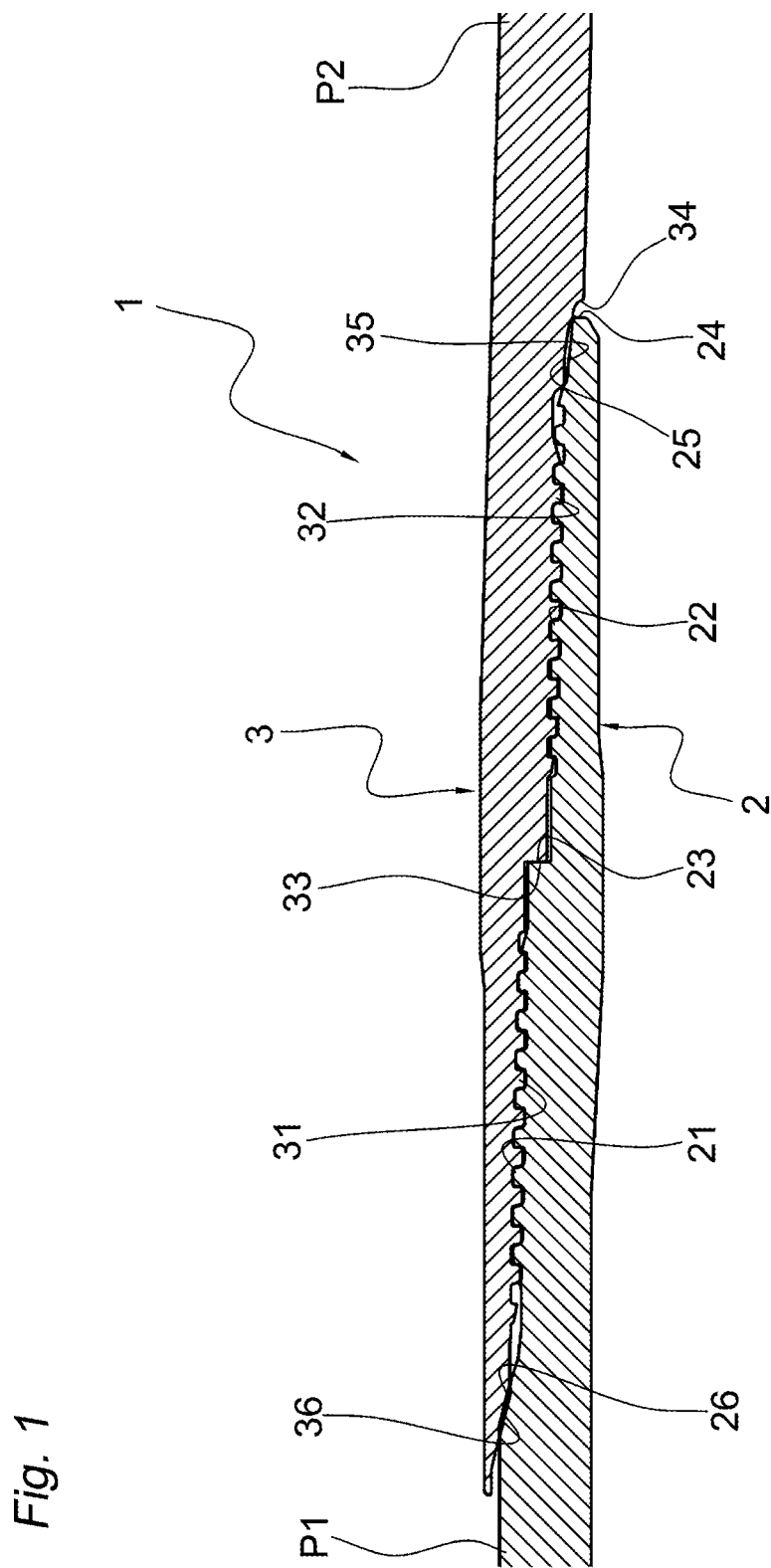
FIG. 1 is a longitudinal cross-sectional view of a threaded connection for pipe according to an embodiment.
Figure 2:
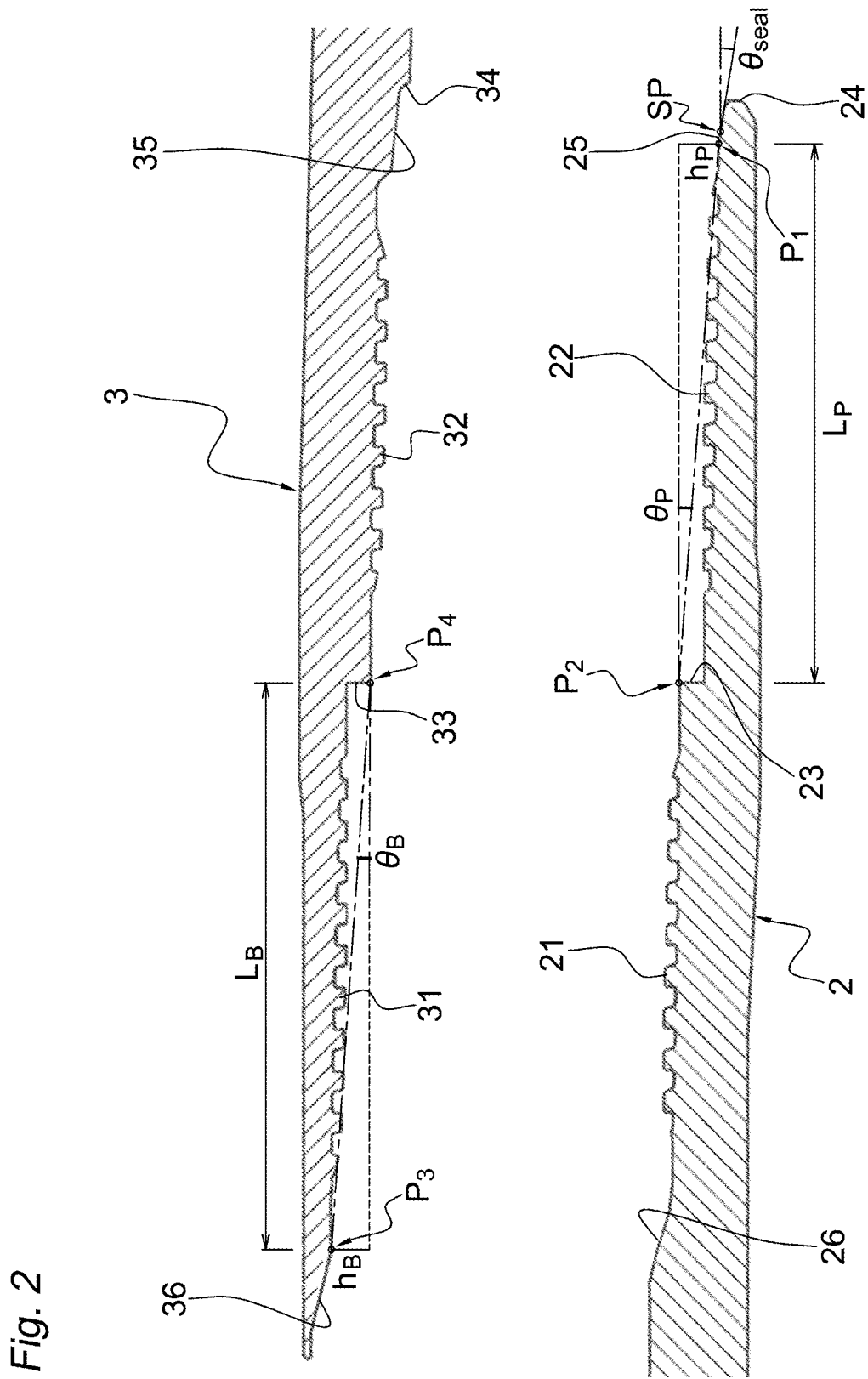
FIG. 2 illustrates the dimensions of characteristic portions of the pin and box.

As illustrated in FIGS. 1 to 4, a threaded connection 1 for pipe according to the present embodiment includes a tubular pin 2 and a tubular box 3. The pin 2 and box 3 are made up as the pin 2 is screwed into the box 3. The pin 2 is located at a pipe end of a first pipe P1, while the box 3 is located at a pipe end of a second pipe P2. The first pipe P1 may be a long pipe, such as oil-well pipe. The second pipe is preferably a long pipe such as oil-well pipe, although it may be a coupling for connecting long pipes. That is, the threaded connection for pipe 1 according to the present embodiment is preferably an integral threaded connection for pipe. The oil-well pipe and coupling are typically made of steel; alternatively, they may be made of a metal such as stainless steel or nickel-based alloy.

The pin 2 may be provided at one swaged end of the first oil-well pipe P1. The box 3 may be provided at one expanded end of the second oil-well pipe P2. Preferably, a pin 2 may be provided at one end of each of the oil-well pipes P1 and P2, while a box 3 may be provided at another end thereof. More particularly, the first oil-well pipe P1 is produced by preparing a hollow shell constituted by a long pipe, swaging one end thereof, and then machining the outer periphery of the swaged end to form components of the pin 2. The second oil-well pipe P2 is produced by preparing a hollow shell constituted by a long pipe, expanding one end thereof, and then machining the inner periphery of the expanded end to form components of the box 3. This provides sufficient wall thicknesses for the pin 2 and box 3 of a semi-flush-type integral threaded connection.

As used herein, "pipe body" means the portions of an oil-well pipe P1, P2 other than the pin 2 and box 3 and that have been neither swaged nor expanded. "Toward the pipe end of the pin 2" indicates the direction from the pipe body of the pin 2 toward the pipe end of the pin 2, which is sometimes also referred to as "direction of the tip". "Toward the pipe body of the pin 2" indicates the direction from the pipe end of the pin 2 toward the pipe body of the pin 2, which is sometimes also referred to as "direction of the basement". "Toward the open end of the box 3" indicates the direction from the pipe body of the box 3 toward the open end of the box 3.

The pin 2 may include: a first male thread 21; a second male thread 22 located further toward the pipe end of the pin 2 than the first male thread 21 is and having a smaller diameter than the first male thread 21; a pin intermediate shoulder 23 located between the first and second male threads 21 and 22; a pin end shoulder 24 located at the pipe end of the pin 2; a pin inner sealing surface 25 located between the second male thread 22 and pin end shoulder 24; and a pin outer sealing surface 26 located between the first male thread 21 and the pipe body of the pin 2. The first and second male threads 21 and 22 are spaced apart from each other in the axial direction, and the pin intermediate shoulder 23 may be located therebetween.

Preferably, each of the first and second male threads 21 and 22 is constituted by a tapered thread. Preferably, the first and second male threads 21 and 22 have the same thread taper angle and the same thread pitch. Preferably, the taper generatrix of the tapered thread constituting the second male thread 22 is located radially inward of the taper generatrix of the tapered thread constituting the first male thread 21. The pin intermediate shoulder 23 may be constituted by the side of a stepped portion formed by a portion of the outer periphery of the pin located between the first and second male threads 21 and 22. The pin intermediate shoulder 23 includes a pin intermediate shoulder surface that faces toward the pipe end of the pin 2. Each of the first and second male threads 21 and 22 may be a trapezoidal thread, an API round thread, an API buttress thread, or a wedge thread, for example.

The box 3 may include: a first female thread 31 to be in engagement with the first male thread 21 upon completion of make-up; a second female thread 32 to be in engagement with the second male thread 22 upon completion of make-up; a box intermediate shoulder surface 33 to be in contact with the pin intermediate shoulder 23 upon completion of make-up; a box end shoulder surface 34 provided to correspond to the pin end shoulder 24; a box inner sealing surface 35 located between the second female thread 32 and box end shoulder 34 to be in contact with the pin inner sealing surface 25 along the entire circumference upon completion of make-up; and a box outer sealing surface 36 located between the first female thread 31 and box open end to be in contact with the pin outer sealing surface 26 along the entire circumference upon completion of make-up. The pin and box inner sealing surfaces 25 and 35 may function as an internal-pressure seal that exhibits sealability mainly against internal pressures. The pin and box outer sealing surface 26 and 36 may function as an external-pressure seal that exhibits sealability mainly against external pressures.

The first and second female threads 31 and 32 are spaced apart from each other in the axial direction, and the box intermediate shoulder 33 may be located therebetween. Preferably, each of the first and second female threads 31 and 32 is constituted by a tapered thread complementary to the corresponding one of the first and second male threads 21 and 22. The box intermediate shoulder 33 may be constituted by a stepped portion formed by a portion of the inner periphery of the box 3 located between the first and second female threads 31 and 32. The box intermediate shoulder 33 includes a box intermediate shoulder surface that faces toward the open end of the box 3 and is to face the pin intermediate shoulder surface of the pin intermediate shoulder 23. The box intermediate shoulder surface 33 is in contact with the pin intermediate shoulder 23 at least upon completion of make-up, and the intermediate shoulders 23 and 33 function as torque shoulders that exhibit torque performance. Each of the first and second female threads 31 and 32 may be a trapezoidal thread, an API round thread, an API buttress thread, or a wedge thread, for example, that is complementary to the corresponding one of the first and second male threads 21 and 22.

Upon completion of make-up, the pin end shoulder 24 may be spaced apart from the box end shoulder 34, as shown in FIG. 1, or may be in contact with the box end shoulder 34. In implementations where these end shoulders 24 and 34 are spaced apart upon completion of make-up, they may be constructed in such a manner that, upon application of a predetermined axial compressive load smaller than the yield compressive load of the threaded connection, the resulting elastic deformation of the pin 2 and box 3 causes the end shoulders 24 and 34 to contact each other to bear part of the axial compressive load.

Each of the intermediate shoulders 23 and 33 of the pin 2 and box 3 is constituted by a flat surface perpendicular to the pipe axis; alternatively, each of them may be constituted by a taper surface inclined such that the radially outer edge is located further toward the pipe end of the pin 2 than the radially inner edge.

Each of the sealing surfaces 25, 35, 26 and 36 may have any appropriate longitudinal cross-sectional shape; in the threaded connection 1 shown in FIGS. 1 to 4, each sealing surface is constituted by a taper surface that appears as an inclined straight line in a longitudinal cross section. Alternatively, one of each pair of sealing surfaces that contact each other may be constituted by a convex curved surface, or both of each pair of sealing surfaces may be constituted by convex curved surfaces. Alternatively, each sealing surface may be constituted by a combination of a convex curved surface and a taper surface with a straight generatrix. In any case, the sealing surfaces are constructed in such a manner that the amount of seal interference increases as the pin 2 is pushed into the interior of the box 3. That is, each of the pin inner sealing surface 25 and the pin outer sealing surface 26 is tapered so as to gradually decrease in diameter as it goes toward the pin tip; the box inner sealing surface 35 is tapered so as to be complementary to the pin inner sealing surface 25; and the box outer sealing surface 36 is tapered so as to be complementary to the pin outer sealing surface 26.

The slope of the straight line connecting the two ends, as determined along the axial direction, of each sealing surface is preferably not smaller than 5% (or 10% as represented as a taper ratio), or more preferably 10%, (or 20% as represented as a taper ratio). Further, the slope of the straight line connecting the two ends, as determined along the axial direction, of each sealing surface is preferably not larger than 25% (or 50% as represented as a taper ratio), and more preferably not larger than 17% (or 34% as represented as a taper ratio). The angle of slope $\theta_{seal}$ of the straight line connecting the two ends, as determined along the axial direction, of the pin inner sealing surface 25 is about 2.9° for a slope of 5%, about 5.7° for a slope of 10%, about 9.7° for a slope of 17%, and about 14.0° for a slope of 25%.

The distance $L_P$, as measured in the axial direction, between the end $P_1$ of the pin inner sealing surface 25 located closer to the pin intermediate shoulder 23 and the radially outer edge $P_2$ of the pin intermediate shoulder 23 may be, for example, 65 to 95 mm, although depending on pipe diameters and/or other factors. The ratio of $L_P$ to the diameter of the radially outer edge of the pin intermediate shoulder 23 may be 20 to 45%.

The distance $L_P$, as measured in the axial direction, between the end P3 of the box outer sealing surface 36 located closer to the box intermediate shoulder 33 and the radially inner edge P4 of the box intermediate shoulder 33 may be, for example, 70 to 100 mm, although depending on pipe diameters and/or other factors. The ratio of $L_B$ to the diameter of the radially inner edge of the box intermediate shoulder 33 may be 20 to 45%. The ratio of $L_P$ to $L_B$ may be 94% to 98%.

The distance $h_P$, as measured in a radial direction, between the end $P_1$ of the pin inner sealing surface 25 located closer to the pin intermediate shoulder 23, on one hand, and the radially outer edge P2 of the pin intermediate shoulder 23, on the other hand, may be, for example, 5.0 to 8.5 mm, although depending on pipe diameters and/or other factors.

The distance $h_B$, as measured in a radial direction, between the end $P_3$ of the box outer sealing surface 36 closer to the box intermediate shoulder 33, on one hand, and the radially inner edge $P_4$ of the box intermediate shoulder 33, on the other hand, may be, for example, 5.0 to 8.5 mm, although depending on pipe diameters and/or other factors. Preferably, $h_P$ and $h_B$ are equal.

The angle of slope $\theta_P$ of the straight line connecting the end $P_1$ of the pin inner sealing surface 25 located closer to the pin intermediate shoulder 33 and the radially outer edge $P_2$ of the pin intermediate shoulder 33 is preferably smaller than 6°, and more preferably smaller than 5.5°. The angle of slope $\theta_B$ of the straight line connecting the end $P_3$ of the box outer sealing surface 36 closer to the box intermediate shoulder 33 and the radially inner edge $P_4$ of the box intermediate shoulder 33 is preferably smaller than 5.5°, and more preferably smaller than 5.3°.

Figure 3:
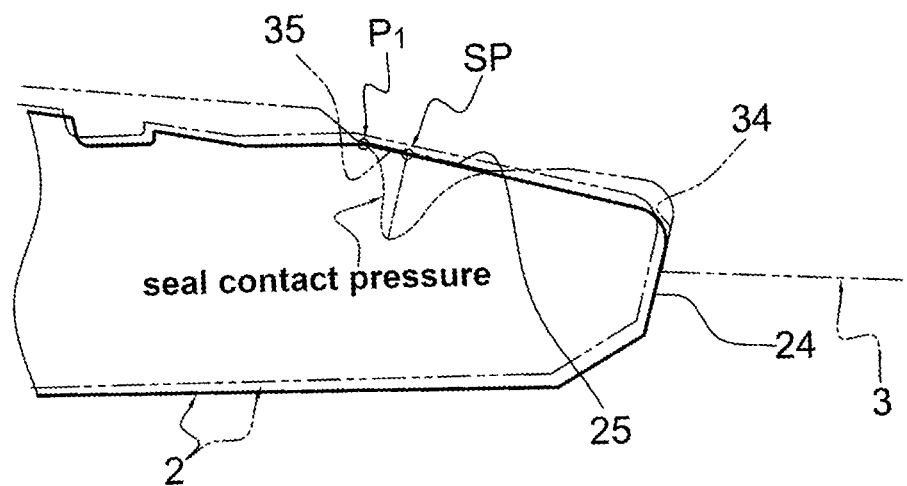
FIG. 3 is an enlarged view of the pin's tip and nearby portions.

FIG. 3 illustrates a distribution of seal contact pressure in the pin inner sealing surface 25 when the connection is made up, and the seal point SP at which the seal contact pressure is at its peak. The shape of the pin 2 before make-up is represented by phantom lines, while the pin as made up is represented by solid lines, where the pin has been slightly deformed radially inwardly by the interference between the sealing surfaces 25 and 35 to reduce its diameter.

Since the internal-pressure sealability is mainly exhibited at the seal point SP, preventing damage to locations on the pin inner sealing surface 25 that are near the seal point SP is particularly important to maintain the internal-pressure sealability. On the other hand, some superficial damage to locations distant from the seal point SP, i.e., locations closer to the end $P_1$ of the pin inner sealing surface located closer to the pin intermediate shoulder 23, are permissible, since such locations do not contribute much to the improvement of the seal contact pressure. This suggests that the internal-pressure sealability can be maintained by designing the connection so as to prevent damage to the seal point SP, which is located radially inward of the end $P_1$.

Figure 4:
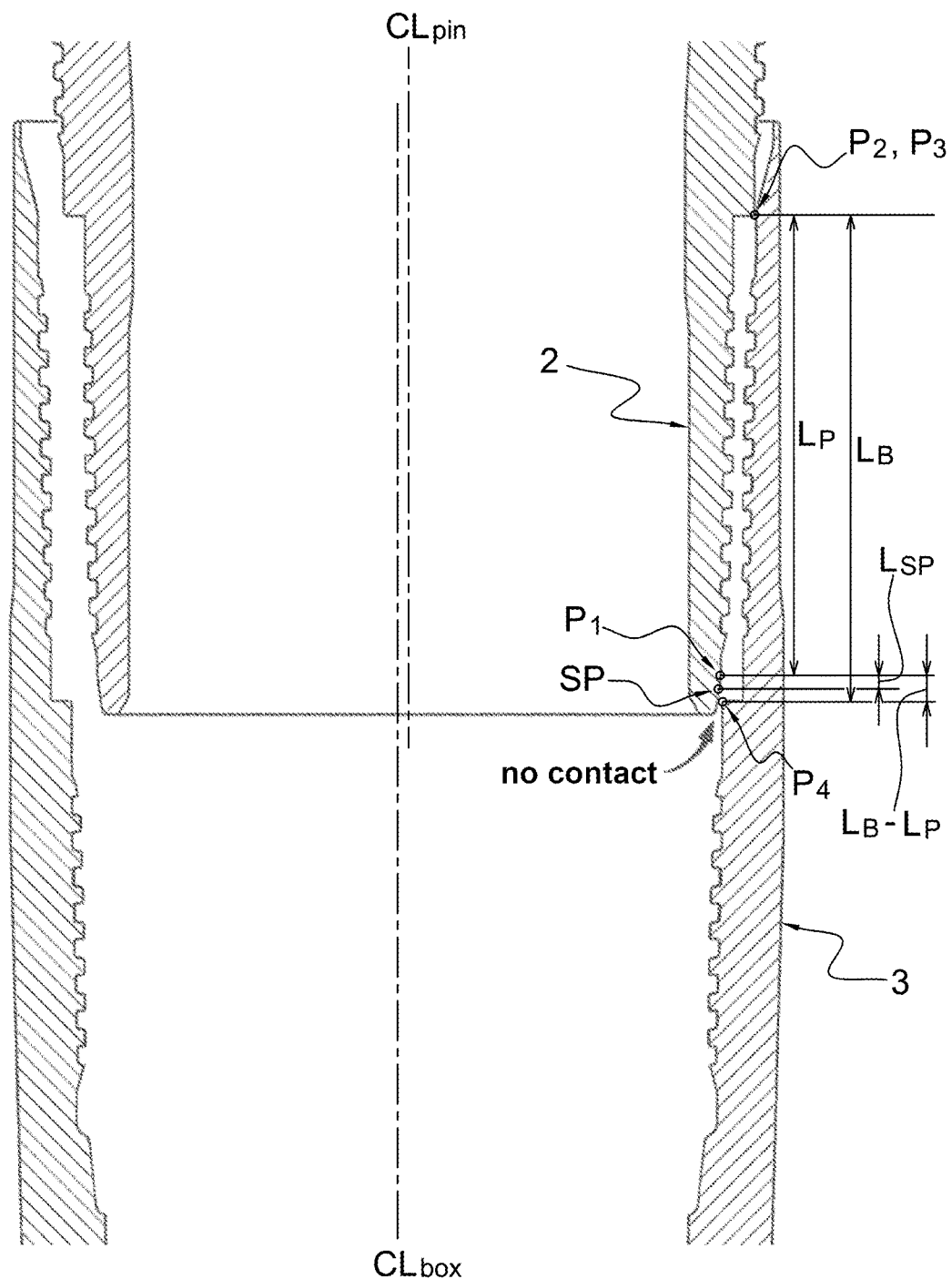
FIG. 4 is a cross-sectional view of the connection as found during stabbing.

As the pin 2 is inserted into the box 3, it becomes likely that the pin inner sealing surface 25 interferes with the box intermediate shoulder 33 when the pipe axis $CL_{PIN}$ of the pin 2 is misaligned with the pipe axis $CL_{BOX}$ of the box 3 and the radially outer edge $P_2$ of the pin intermediate shoulder 23 matches the end $P_3$ of the box outer sealing surface 36, as shown in FIG. 4. The first requirement to prevent damage to at least the seal point SP of the pin inner sealing surface 25 in this state is that the end $P_1$ of the pin inner sealing surface 25 be positioned further toward the open end of the box than the radially inner edge of the box intermediate shoulder 33. Expression (1) is derived therefrom. Although FIG. 4 does not show a stabbing guide, a stabbing guide may be used as necessary.

The pin inner sealing surface 25 gradually decreases in diameter as it goes from the end $P_1$ toward the tip, and the conclusion stated below can be derived therefrom, using the axial distance between the tip $P_1$ of the pin inner sealing surface 25 and the radially inner edge $P_4$ of the box intermediate shoulder 33 in the state shown in FIG. 4, i.e., (LB-LP), and the angle of slope $\theta_{seal}$ of the pin inner sealing surface 25: satisfying Expression (2) makes it difficult for the box intermediate shoulder 33 to hit the pin inner sealing surface 25.

To further ensure that damage to the seal point SP is prevented, it is only required that, in the state shown in FIG. 4, the seal point SP be located further toward the open end of the box than the box intermediate shoulder 33. The following condition can be derived therefrom: the axial distance $L_{SP}$ between the seal point SP on the pin inner sealing surface 25 which experiences the largest seal contact force due to its contact with the box inner sealing surface 35 upon completion of make-up, on one hand, and the end $P_1$ of the pin inner sealing surface 25, on the other hand, is smaller than the difference between $L_B$ and $L_P$.

Satisfying the above-stated conditions will prevent the box intermediate shoulder 33 from contacting the seal point SP of the pin inner sealing surface 25 during stabbing even if $h_B$ is larger than $h_P$.

Further, the angle of slope $\theta_P$ of the straight line connecting the end $P_1$ of the pin inner sealing surface 25 and the radially outer edge $P_2$ of the pin intermediate shoulder 23 is preferably larger than the angle of slope θB of the straight line connecting the end $P_3$ of the box outer sealing surface 36 and the radially inner edge $P_4$ of the box intermediate shoulder 33. Thus, in the state shown in FIG. 4, the end $P_1$ of the pin inner sealing surface 25 can be positioned radially inward of the straight line connecting the end $P_3$ of the box outer sealing surface 36 and the radially inner edge $P_4$ of the box intermediate shoulder 33, further reducing the possibility of the box intermediate shoulder 33 contacting the pin inner sealing surface 25.

Further, the angle of slope $\theta_P$ is preferably smaller than 6°. This will prevent damage to the pin inner sealing surface 25 while restricting the wall-thickness range occupied by the second male thread 22 and pin intermediate shoulder 23.

$L_P$ may be not smaller than 90% of $L_B$, and more preferably may be not smaller than 92%, and yet more preferably not smaller than 94%. Thus, the engagement and strength of the threads of the two-step thread construction will be more uniform, thereby providing a threaded connection 1 that is well-balanced as a whole.

The present disclosure may not only be applied to integral threaded connections, but also to coupling-type connections. Otherwise, the present disclosure is not limited to the above-illustrated embodiment, and various modifications are possible within the scope of the claims.

Explanation of Characters
1: threaded connection for pipe
2: pin; 21: first male thread; 22: second male thread; 23: pin intermediate shoulder; 25: pin inner sealing surface; 26: pin outer sealing surface 3: box; 31: first female thread; 32: second female thread; 33: box intermediate shoulder; 35: box inner sealing surface; 36: box outer sealing surface

The invention claimed is:

1. A threaded connection for pipe, including a tubular pin and a tubular box, the pin and the box adapted to be made up as the pin is screwed into the box, wherein the pin includes: a first male thread; a second male thread located further toward a tip than the first male thread is and having a smaller diameter than the first male thread; a pin intermediate shoulder located between the first male thread and the second male thread; a pin inner sealing surface located further toward the tip than the second male thread is; and a pin outer sealing surface located further toward a basement than the first male thread is, the box includes: a first female thread adapted to be in engagement with the first male thread when the connection is made up; a second female thread adapted to be in engagement with the second male thread when the connection is made up; a box intermediate shoulder located between the first female thread and the second female thread and adapted to be in contact with the pin intermediate shoulder when the connection is made up; a box inner sealing surface adapted to be in contact with the pin inner sealing surface when the connection is made up; and a box outer sealing surface adapted to be in contact with the pin outer sealing surface when the connection is made up, and the threaded connection satisfies the following expressions, (1) and (2):

$$L_P < L_B \quad (1)$$

$$h_B < h_P + (L_B - L_P) \times \tan\theta_{seal} \quad (2)$$

where $L_P$ is a distance between an end of the pin inner sealing surface located closer to the pin intermediate shoulder and a radially outer edge of the pin intermediate shoulder as measured in an axial direction; $L_B$ is a distance between an end of the box outer sealing surface located closer to the box intermediate shoulder and a radially inner edge of the box intermediate shoulder as measured in the axial direction; $h_P$ is a distance between the end of the pin inner sealing surface located closer to the pin intermediate shoulder and the radially outer edge of the pin intermediate shoulder as measured in a radial direction; $h_B$ is a distance between the end of the box outer sealing surface located closer to the box intermediate shoulder and the radially inner edge of the box intermediate shoulder as measured in the radial direction; and $\theta_{seal}$ is an angle of slope of a straight line connecting the end of the pin inner sealing surface located closer to the pin intermediate shoulder and an end of the pin inner sealing surface located closer to the tip, as determined along the axial direction.

2. The threaded connection for pipe according to claim 1, wherein an angle of slope of a straight line connecting the end of the pin inner sealing surface located closer to the pin intermediate shoulder and the radially outer edge of the pin intermediate shoulder, θp, is larger than an angle of slope of a straight line connecting the end of the box outer sealing surface located closer to the box intermediate shoulder and the radially inner edge of the box intermediate shoulder, $\theta_B$.

3. The threaded connection for pipe according to claim 2, wherein the angle of slope $\theta_P$ is smaller than 6°.

4. The threaded connection for pipe according to claim 3, wherein $L_P$ is larger than 94% of $L_B$.

5. The threaded connection for pipe according to claim 3, wherein $h_B$ is larger than $h_P$.

6. The threaded connection for pipe according to claim 3, wherein a distance $L_{SP}$, as measured in the axial direction, between a seal point on the pin inner sealing surface at which a seal contact force resulting from the surface's contact with the box inner sealing surface upon completion of make-up is at its largest and the end of the pin inner sealing surface located closer to the pin intermediate shoulder is smaller than a distance between $L_B$ and $L_P$.

7. The threaded connection for pipe according to claim 2, wherein $L_P$ is larger than 94% of $L_B$.

8. The threaded connection for pipe according to claim 2, wherein $h_B$ is larger than $h_P$.

9. The threaded connection for pipe according to claim 2, wherein a distance $L_{SP}$, as measured in the axial direction, between a seal point on the pin inner sealing surface at which a seal contact force resulting from the surface's contact with the box inner sealing surface upon completion of make-up is at its largest and the end of the pin inner sealing surface located closer to the pin intermediate shoulder is smaller than a distance between $L_B$ and $L_P$.

10. The threaded connection for pipe according to claim 1, wherein $L_P$ is larger than 94% of $L_B$.

11. The threaded connection for pipe according to claim 4, wherein $h_B$ is larger than $h_P$.

12. The threaded connection for pipe according to claim 10, wherein a distance $L_{SP}$, as measured in the axial direction, between a seal point on the pin inner sealing surface at which a seal contact force resulting from the surface's contact with the box inner sealing surface upon completion of make-up is at its largest and the end of the pin inner sealing surface located closer to the pin intermediate shoulder is smaller than a distance between $L_B$ and $L_P$.

13. The threaded connection for pipe according to claim 1, wherein $h_B$ is larger than $h_P$.

14. The threaded connection for pipe according to claim 13, wherein a distance $L_{SP}$, as measured in the axial direction, between a seal point on the pin inner sealing surface at which a seal contact force resulting from the surface's contact with the box inner sealing surface upon completion of make-up is at its largest and the end of the pin inner sealing surface located closer to the pin intermediate shoulder is smaller than a distance between $L_B$ and $L_P$.

15. The threaded connection for pipe according to claim 1, wherein a distance $L_{SP}$, as measured in the axial direction, between a seal point on the pin inner sealing surface at which a seal contact force resulting from the surface's contact with the box inner sealing surface upon completion of make-up is at its largest and the end of the pin inner sealing surface located closer to the pin intermediate shoulder is smaller than a distance between $L_B$ and $L_P$.

* * * * *